United States Patent
Sendzik

(10) Patent No.: US 6,612,504 B2
(45) Date of Patent: Sep. 2, 2003

(54) DUAL HEAT EXCHANGE MODE WATER HEATING SYSTEM FOR BOATS

(75) Inventor: Nestor I. Sendzik, New Hope, PA (US)

(73) Assignee: Applied Marine Hydronics, Inc., New Hope, PA (US)

( * ) Notice: Subject to any disclaimer, the term of this patent is extended or adjusted under 35 U.S.C. 154(b) by 64 days.

(21) Appl. No.: 10/005,388

(22) Filed: Dec. 3, 2001

(65) Prior Publication Data

US 2003/0104333 A1 Jun. 5, 2003

(51) Int. Cl.[7] ................................................. B60H 1/02
(52) U.S. Cl. ..................................... 237/12.3 B; 165/41
(58) Field of Search ....................... 237/12.3 R, 12.3 B, 237/12.3 C; 165/41, 42

(56) References Cited

U.S. PATENT DOCUMENTS

| | | | | |
|---|---|---|---|---|
| 3,758,031 A | * | 9/1973 | Moran ........................ | 237/8 A |
| 4,249,491 A | * | 2/1981 | Stein .................... | 123/142.5 R |
| 4,556,171 A | * | 12/1985 | Fukami et al. ......... | 237/12.3 B |
| 4,591,691 A | * | 5/1986 | Badali ........................ | 219/202 |
| 4,706,644 A | * | 11/1987 | Nakai ......................... | 126/101 |
| 6,332,580 B1 | * | 12/2001 | Enander et al. ............. | 237/2 A |

* cited by examiner

Primary Examiner—Derek Boles
(74) Attorney, Agent, or Firm—Donald R. Piper, Jr.; Dann, Dorfman, Herrell and Skillman

(57) ABSTRACT

A heating system is provided for heating fresh water on boats, marine vessels and the like. The boat's water supply is connected to a hot water tank, which in turn is in fluid communication with a heat exchanger. The coolant line for a boat engine passes through the heat exchanger, through the hot water tank and back to the engine. Heat from the engine is transferred from the coolant line to the water in the hot water tank at a rate that varies with engine operation. The heat exchanger allows additional heat transfer to the water as the coolant and water pass through the heat exchanger. A sensor regulates circulation of water through the heat exchanger. The heat exchanger may be retrofitted externally of an existing hot water tank by connecting the heat exchanger to existing water lines for the hot water tank and to an existing engine coolant line to effect heat transfer from the engine coolant line.

49 Claims, 3 Drawing Sheets

DUAL HEAT EXCHANGE MODE WATER HEATING SYSTEM FOR BOATS

FIELD OF THE INVENTION

The present invention relates to a system and method for heating fresh water on boats and other marine vessels. More specifically, the present invention relates to improved heating systems employing heat exchangers that function to transfer heat energy to fresh water while a boat or marine vessel engine is running at low rpms.

BACKGROUND

Boats and other marine vessels use a number of energy sources to heat fresh water stored in a hot water tank. The source chosen at a particular time generally depends on whether the boat is away from dock and how the boat is being operated. When the boat is at a dock with an electrical power supply available, the hot water tank may be heated by supplying an electrical current through a resistance heating element immersed in the tank. When the boat is away from dock, however, the boat engine is often used as the source of heat. The hot water tank is typically heated by running the engine and cycling engine coolant through a closed loop that passes through the hot water tank to transfer heat to the fresh water.

Conventional closed loop water heating systems are often relatively inefficient, however, for heating fresh water on boats. This is most apparent when the boat engine is idling at relatively low rpms and subject to low loads. During high rpms or high engine loads, there is little difficulty in heating the hot water tank due to the enormous amount of heat generated in the engine. During low load operation and low rpms, however, a relatively low amount of heat is produced by the engine. In addition, the coolant pipe passing through the hot water tank provides a relatively small surface area in contact with the water, resulting in relatively low heat transfer. Corrosion and scaling on the conduit can diminish heat transfer even further. As a result, boat captains are frequently compelled to run the engine at high rpms for significant periods of time to supply enough hot water for multiple showers. Running a boat engine for an extended period of time results in unnecessary fuel consumption and causes unnecessary strain on the boat's engine.

SUMMARY OF THE INVENTION

With the foregoing in mind, the present invention provides an improved water heating system for use on boats, marine vessels and the like. The heating system includes a hot water tank connected with a heat exchanger such as a supplemental external heat exchanger. The heat exchanger, which may be a plate heat exchanger, has first and second flow paths. The first flow path is connected with the hot water tank in a closed loop to cycle water between the hot water tank and the heat exchanger. The second flow path is connected to an engine coolant pipe which may also pass from the boat engine through the hot water tank. A circulation pump is connected between the hot water tank and the first flow path in the heat exchanger to control the cycling of water between the tank and the heat exchanger. Since heated water is circulated through the system, the system provides more efficient heat transfer than prior art systems that use convection heat transfer in static hot water tanks.

Coolant fluid in the coolant line for the engine is cycled through both the hot water tank and the heat exchanger as the engine operates. In one embodiment, operation of the circulation pump is controlled by a manual switch. In another embodiment, the circulation pump is controlled automatically by operating conditions in the boat. In particular, the circulation pump may be controlled by a temperature sensor in the hot water tank. When the temperature drops to a minimum temperature, the sensor sends a signal to activate the circulation pump. Water is then cycled between the hot water tank and the first flow path in the heat exchanger until the temperature sensor detects a maximum temperature in the hot water tank. The circulation pump is then switched off. The circulation pump may also be controlled by other conditions in the boat, such as engine rpms.

In accordance with the invention, a supplemental water heating kit may be used to supplement or retrofit an existing hot water tank of a boat through cooperation with the coolant line for the engine of the boat. The existing hot water tank may include a cold water inlet for enabling water to be input to the hot water tank and a hot water outlet to enable hot water stored in the tank to be drawn from the water tank. An engine coolant conduit connected with the coolant line from the boat engine may run through the hot water tank to heat water in the hot water tank. In such an embodiment, the supplemental water heating kit may include a heat exchanger adapted to be positioned externally of the hot water tank. The heat exchanger may include an exchanger water inlet and an exchanger water outlet with a first flow path extending through the heat exchanger from the exchanger water inlet to the exchanger water outlet. The hot water tank may be fluidly connected to the first flow path using a variety of piping configurations. The first flow path may be fluidly connected with the cold water inlet and the hot water outlet of the hot water tank. Alternatively, the first flow path may be fluidly connected to circulation inlet and circulation outlet ports on the hot water tank that are distinct from the cold water inlet and hot water outlet on the hot water tank. The heat exchanger may include a coolant inlet and a coolant outlet with a second flow path extending through the heat exchanger from the coolant inlet to the coolant outlet. The second flow path is provided for fluid connection with the coolant line from the engine of the boat so that heated engine coolant may be circulated through the second flow path of the heat exchanger.

A water pump may also be provided in the kit for connection in fluid communication between the hot water tank and the exchanger water inlet of the heat exchanger. The pump operates to circulate water from the hot water tank through the first flow path of the heat exchanger as heated engine coolant from the engine is circulated through the second flow path of the heat exchanger to effect heat transfer from the heated engine coolant to the water circulating through the first flow path. The water heated along the first flow path of the heat exchanger is then reintroduced back into the hot water tank.

The kit may also include a water outlet line for the heat exchanger for fluid connection between the exchanger water outlet and the hot water tank to enable heated water from the heat exchanger to be circulated from the first flow path back into the hot water tank. In a specific arrangement, the water outlet line may be connected between the exchanger water outlet and the cold water inlet of the hot water tank. The water outlet line may alternatively be connected between the exchanger water outlet and a circulation inlet port on the hot water tank that is distinct from the cold water inlet.

The kit may also include a water inlet line for the heat exchanger for connection between the hot water outlet of the water tank and the exchanger water inlet of the heat exchanger. In specific operation, the water pump may be connected between the hot water outlet of the hot water tank and the exchanger water inlet by connection into the water inlet line.

The kit may also comprise a coolant inlet line for fluid connection between the coolant line of the engine and the coolant inlet of the heat exchanger. A coolant outlet line may also be included in the kit for fluid connection between the coolant outlet of the heat exchanger and the coolant line of the engine so that heated engine coolant may be circulated from the coolant line of the engine through the second flow path.

A one-way valve may be provided in the kit for connection with the cold water inlet of the hot water tank, for example, along a cold water source line that supplies cold water to the cold water inlet of the hot water tank. The water outlet line from the heat exchanger can be connected with the cold water source line intermediate the hot water tank and the one-way valve so that the one-way valve prevents back flow of heated water from the heat exchanger and the hot water tank toward the cold water source. A second one-way valve may be provided for connection with the hot water outlet of the hot water tank, for example, along a hot water supply line from the hot water tank. The water inlet line to the heat exchanger can be connected with the hot water supply line intermediate the one-way valve and the hot water tank so that the one-way valve prevents back flow of water toward the hot water tank as the pump operates to circulate water from the hot water tank to the heat exchanger.

A thermal mixing valve may also be provided with the kit to prevent heated water from being discharged from the system at scalding temperatures. The thermal mixing valve may be installed in the hot water supply line that leaves the hot water tank. The mixing valve is connected to a source of cold water and periodically draws a volume of cold water into the hot water supply line to maintain the water temperature below a maximum temperature as the water leaves the system. The thermal mixing valve may be connected to a thermostat control that allows individuals to select a maximum temperature for hot water output.

DESCRIPTION OF THE DRAWINGS

The foregoing summary as well as the following description will be better understood when read in conjunction with the following drawings, in which.

DETAILED DESCRIPTION OF THE PREFERRED EMBODIMENT

Figure 1:
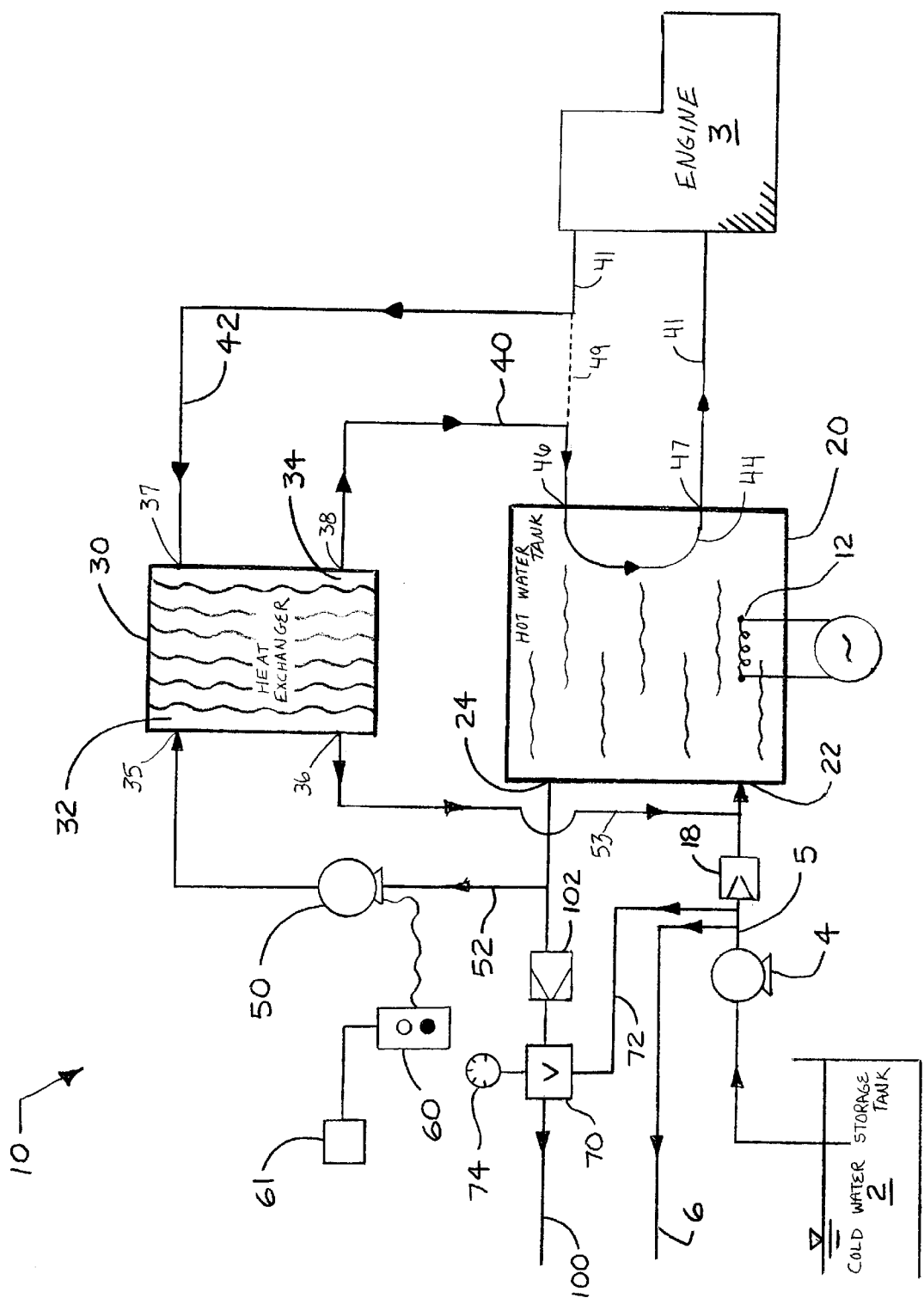
FIG. 1 is a block diagram illustrating a water heating system in accordance with the present invention.

Referring now to FIG. 1, in which arrows represent the direction of fluid flow, a water heating system 10 is provided for heating fresh water on boats, marine vessels and the like. In general, a fresh water supply 2 is provided in the form of a cold water storage tank which serves as the source of cold, or at least ambient, temperature water for use on the boat. From the water supply 2, cold water is piped to a hot water tank 20 which functions to heat the cold water to provide a source of hot water for the boat. The water in the hot water tank is heated by circulating a flow of heated engine coolant from a boat engine 3 through the hot water tank 20. A coolant pipe from the boat's engine 3 provides a coolant line 41 that is passed through the hot water tank 20 and is connected with the heat exchanger 30. As the engine 3 runs, heated coolant in the coolant line 41 cycles through the hot water tank 20 and the heat exchanger 30 dissipating heat from the engine. The fresh water stored in hot water tank 20 absorbs the heat from a coolant line conduit segment 44 of the coolant line 41 that passes through the hot water tank. In addition, water from the hot water tank 20 may be selectively circulated through the heat exchanger 30 where it absorbs additional heat before flowing back into the hot water tank 20.

Additionally, a supplemental electric heater 12 may be used in the hot water tank 20 to heat or maintain the water at a desired water temperature. The hot water tank 20 discharges heated water to a hot water main 100 which conveys the heated water to desired areas on the boat. The hot water main 100 serves as the hot water supply line for the boat. Likewise, in order to provide cold water to desired locations on the boat, a cold water main 6 is connected with the storage tank 2. The cold water main 6 serves as the cold water supply line for the boat.

In general operation, the heating system 10 is operable in two modes: an active heating mode and a passive heating mode. In the passive heating mode, sufficient heat transfer is effected between the engine coolant in the coolant line conduit 44 and the water in hot water tank 20 to heat the water to a desired temperature. This is most often the case when the engine 3 is operated at high rpms and/or subjected to high loads. In this passive mode of operation, water in the hot water tank 20 is discharged to the hot water main 100 without circulation through the heat exchanger 30. In the active heating mode, there is typically insufficient heat transfer between the coolant line conduit 44 and the water in hot water tank 20 to generate the desired temperature in the hot water efficiently. This is typically the case when the engine is idling at low rpms, generating a smaller amount of heat and a smaller heat gradient between the coolant line conduit 44 and the water. In the active heating mode, a circulation pump 50 is activated to circulate water from the hot water tank 20 through the heat exchanger 30 and then back into the hot water tank. Heated engine coolant is circulated through the heat exchanger simultaneously with the water through the heat exchanger. The heat exchanger 30 efficiently transfers heat from the heated engine coolant to the circulated water to raise the temperature of the hot water to a desired temperature in a relatively short period of time.

Referring now to FIG. 1, the heating system 10 will be described in more detail. In this description, it is to be understood that certain components, including but not limited to, fittings, bends, gaskets and couplings, are provided in accordance with standard engineering practice. A high pressure pump 4 is utilized to convey fresh water from the boat's fresh water supply 2 to the hot water tank 20. For this purpose, the high pressure pump 4 is connected on a force main 5 which runs from the water supply storage tank 2 to the hot water tank 20. The force main 5 serves as a cold water source line for both the hot water tank 20 and the cold water main 6 connected into the force main 5. The cold water main 6 splits off the force main 5 prior to hot water tank 20, as shown as in FIG. 1, to provide the cold water supply line for the boat. The force main 5 connects with an inlet port 22 in the wall of hot water tank 20 to convey water into the tank. The inlet port 22 serves as the cold water inlet for the hot water tank 20. Preferably, the inlet port 22 is located near the bottom of tank 20. A check valve or unidirectional valve 18 is installed in the force main 5 between the pump 4 and the hot water tank 20 to prevent backflow of water from the hot water tank 20 into the water supply 2 and cold water main 6 when the high pressure pump 4 is switched off.

An outlet port 24 is provided in the wall of tank 20 to provide a discharge point for heated water from the hot water tank 20. The outlet port 24 is connected with the hot water supply line 100 to provide a source of hot water to desired discharge locations of the boat. The outlet port 24 serves as the hot water outlet for the heating tank 20. Since heat rises in a column of water, the hottest water in the tank will generally migrate toward the top of the tank. Therefore, it would be desirable for the outlet port 24 to be preferably located near the top of the tank so that the hottest water may be withdrawn from the tank. The hot water tank 20 is preferably made from an insulated polymer or metal tank designed to maintain water temperature within the tank for as long as possible.

In order to heat the water contained in the heating tank 20, a flow of heated engine coolant from the coolant line 41 may be directed through the heating tank 20. For this purpose, the coolant line conduit segment 44 is positioned within the heating tank to enable a flow of heated engine coolant to be passed through the hot water tank 20 without leaking or intermixing with the water in the tank 20. To maximize heat transfer, the coolant line conduit 44 should be made from a heat conductive material. The coolant line conduit 44 passes internally of the hot water tank between an inlet port 46 and an outlet port 47 provided on the walls of the hot water tank 20 for connection with respective supply and return runs of the coolant line 41.

Figure 2:
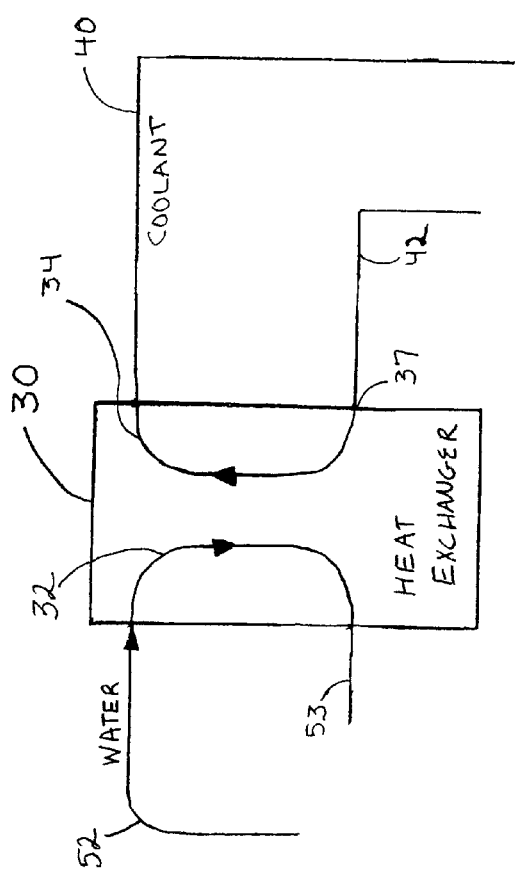
FIG. 2 is a schematic representation of a heat exchanger used in accordance with the water heating system of FIG. 1 showing a flow of water through the heat exchanger in a counter current direction relative to a flow of heating coolant through the heat exchanger.

The heat exchanger 30 may be any type of heat exchanger known in the art, such as a gasket ed heat exchanger or a shell and tube type heat exchanger. Preferably, the heat exchanger is a brazed thin plate heat exchanger unit. Heat exchanger 30 may be mounted or positioned externally of the hot water tank. FIGS. 1 and 2 illustrate one configuration for interconnecting a heat exchanger and a hot water tank. The exchanger 30 includes a first flow path 32 and second flow path 34. The first flow path 32 through the heat exchanger provides a flow path for water to and from the hot water tank. For this purpose, the first flow path extends from an exchanger water inlet 35 on the exchanger to an exchanger water outlet 36. A circulation pipe 52 is connected to the hot water main 100 to fluidly connect the main 100 to the first flow path 32 of heat exchanger 30. The circulation pipe 52 provides a water inlet line from the hot water outlet 24 of the hot water tank 20 to the exchanger water inlet 35 of the heat exchanger 30. A check valve or unidirectional valve 102 is installed in the hot water main 100 downstream from the connection of the circulation pipe 52. The valve 102 prevents any backflow of water into the hot water tank 20 when pressure drops in the main 100.

As shown in FIG. 1, the water inlet line provided by the circulation pipe 52 is connected into the hot water supply line provided by main 100 at a point intermediate the valve 102 and the hot water tank 20. A circulation pump 50 is installed along the circulation pipe 52 so that the influence end of the pump receives water from the hot water main 100 and the effluent end of the pump discharges water to the heat exchanger 30. The water from the pump 50 passes through the first flow path 32 of the heat exchanger 30 where the water is heated. The heated water is then discharged from the exchanger water outlet 36 into a return circulation pipe 53 that is connected between the exchanger water outlet 36 and the force main 5. The return circulation pipe 53 serves as a water outlet line from the heat exchanger. The return circulation pipe 53 is connected into the force main 5, which serves as the cold water source line, at a point intermediate the unidirectional valve 18 and the cold water inlet 22 of the hot water tank 20. As such, the valve 18 prevents a backflow of heated water from the heat exchanger and the hot water tank from flowing toward the cold water storage tank 2. The circulation pipe 52, the pump 50, the return circulation pipe 53, and the first flow path 32 through the heat exchanger 30 provide a closed water circulation loop between the hot water supply line 100 and the cold water source line 5. The circulation pipe 52 and the return circulation pipe 53 may be constructed of suitable material such as metal or plastic or may be in the form of rigid or flexible tubing or other types of suitable conduit material. Such pipes 52 and 53 may be provided together with the pump 50 and the exchanger 30 as part of a kit for retrofit ting the heat exchanger to an existing hot water tank of a boat.

Figure 3:
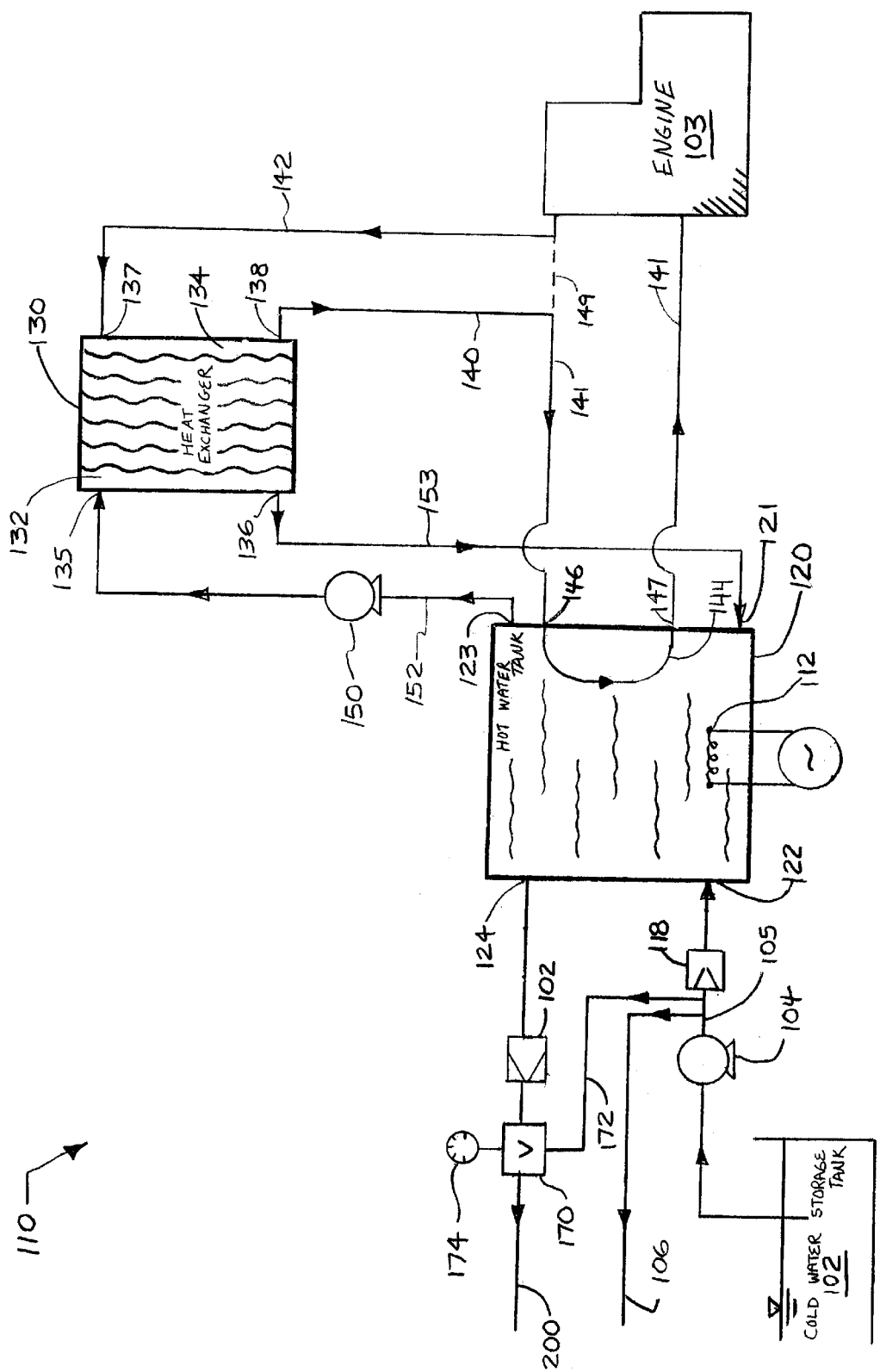
FIG. 3 is a block diagram illustrating an alternate configuration for a water heating system in accordance with the present invention.

Thus far, the circulation pipe 52 has been illustrated as a pipe that exits the hot water main 100 and connects to the exchanger water inlet 35, as shown in FIG. 1. In addition, return circulation pipe 53 has been illustrated as a pipe that exits the exchanger water outlet 36 and connects to force main 5. The heat exchanger circulation pipes 52, 53 may fluidly connect the hot water tank 20 and heat exchanger 30 in various configurations, however, and need not be configured as shown in FIG. 1. Referring now to FIG. 3, an alternative system 110 is shown having a different piping configuration. Elements that correspond with elements in FIG. 1 are shown in FIG. 3 with the same reference number plus one hundred. In FIG. 3, the hot water tank 120 has a circulation outlet port 123 and a circulation inlet port 121, said outlet port being distinct from the hot water outlet 124 and said inlet port being distinct from the cold water inlet 122. A circulation pipe 152 is connected between an exchanger water inlet 135 and the circulation outlet port 123 in the wall of the hot water tank 120. In addition, a return circulation pipe 153 is connected between an exchanger water outlet 136 and the circulation inlet port 121.

Referring again to FIG. 1, the heat exchanger 30 may be connected with the coolant line 41 for the engine 3 to provide heat to the water circulating through the first flow path. The coolant line 41 provides a closed coolant circulation loop in fluid connection with the hot water tank 20 and the heat exchanger 30. The closed coolant circulation loop functions to prevent any intermixing of engine coolant with the water supply. As shown in FIG. 1, the coolant line 41 includes a supply run that feeds to the inlet port 46 of the hot water tank 20 to supply a flow of heated engine coolant to the coolant line conduit segment 44 passing through the tank 20. From the outlet port 47 of the tank, the engine coolant is discharged into the return run of the coolant line 41 for return to the engine 3. In order to supply heated engine coolant from the engine 3 to the heat exchanger, a coolant inlet line 42 may be provided from the coolant line 41 to a coolant inlet 37 on the heat exchanger. Likewise, a coolant outlet line 40 may be provided from a coolant outlet 38 on the heat exchanger 30 back into the coolant line 41. The coolant inlet and outlet lines 42, 40 may be integral runs or extensions of the coolant line 41. Alternatively, such lines 42, 40 may be provided as separate pieces or component lines that are tapped into or connected with the coolant line 41. For example, the coolant inlet and outlet lines 42, 40 may be provided as part of the retrofit kit for the purpose of retrofitting an existing hot water tank on a boat with a heat exchanger 30. As shown in FIG. 1, for example, a coolant line segment 49 (shown in phantom) of the supply run of the coolant line 41 may be cut or removed so that the coolant inlet and outlet lines 42 and 40 may be connected at the gap in the supply run to interconnect the heat exchanger 30 into the coolant line 41 in a closed loop fashion. The exchanger 30 may alternatively be connected into the return run of the coolant line 41 so that heated engine coolant is first directed through the hot water tank and then through to the heat exchanger. When connected, as shown in FIG. 1, heated engine coolant from the coolant line 41 flows through the coolant inlet line 42 and into the heat exchanger 30. The heated coolant passes through the second flow path 34 of the exchanger 30 to radiate heat to the flow of water through the first flow path. From the second flow path, the engine coolant is discharged from the exchanger 30 to the coolant outlet line 40 for supply to the coolant line conduit segment 44 internal to the hot water tank 20. Preferably, as shown in FIG. 2, coolant in the coolant inlet line 42 enters the coolant inlet 37 of the heat exchanger 30 so as to flow through the second flow path 34 along a counter current direction relative to the water flowing through the first flow path 32.

Heating system 10 may operate between the active and passive modes by a manual control. In a manual system, operation of the circulation pump 50 is controlled by a switch, which may be engaged by an individual when the supply of hot water is low or depleted. Preferably, the switch is wired to the ignition switch in engine 3 such that the switch will only activate the circulation pump 50 if the engine and alternator are running.

Alternatively, heating system 10 may operate between the active and passive modes by automatic control. In automatic operation, heating system 10 may alternate between the active heating mode and the passive heating mode under the control of a sensor 60 that regulates operation of circulation pump 50. In particular, the sensor 60 may function to switch the circulation pump 50 on when the system is in the active heating mode and to switch the pump off when the system is in the passive heating mode. For example, the sensor 60 may include a temperature probe operable to monitor water temperature in the hot water tank 20 during engine operation. In particular, the sensor 60 may be operable to activate the circulation pump 50 when the temperature in tank 20 drops below a minimum temperature limit. When pump 50 is activated, water is cycled between the hot water tank 20 and the first flow path 32 in heat exchanger 30 to transfer additional heat to water in the tank. Pump 50 continues to operate until the temperature sensor 60 detects a maximum temperature limit in the tank 20. At a maximum temperature indication, the sensor 60 may operate to send a signal to switch off the circulation pump 50. The minimum and maximum temperatures may be adjustable via a standard thermostat connected to the sensor 60. For example, the minimum temperature limit in the tank 20 may be set to 110° F. And the maximum temperature limit in the tank may be set to 160° F. The thermostat may allow for a broad range of temperature adjustments to account for different tank sizes, hot water consumption rates, engine performances, heat losses and other factors.

In automatic systems, it is desirable to prevent the circulation pump 50 from operating when the engine and alternator are not running. If the circulation pump 50 operates for a prolonged period of time when the engine is not operating, the pump may drain the boat's on-board power supply. Therefore, the pump controls in system 10 are preferably tied to the ignition switch in the boat. More specifically, the sensor 60 in automatic systems is preferably wired through the ignition switch so that the pump 50 is only activated if the engine and alternator are running.

In automatic systems, a manual override mechanism 61 may be included to temporarily operate the circulation pump 50 when the sensor 60 would otherwise normally keep the pump 50 off. A manual override 61 may be desirable when a large volume of hot water is consumed. In such a case, the process of heating fresh water supplied to the hot water tank can be accelerated by actuating the override mechanism and temporarily operating the circulation pump 50 in the active heating mode. After a preset time, the override mechanism may disengage.

The circulation pump 50 may be automatically controlled based on a number of operating conditions, and need not be controlled based on temperature in the hot water tank. For example, operation of the circulation pump 50 can be controlled based on engine rpms. In such a configuration, the sensor 60 may monitor engine rpms and actuate the circulation pump 50 when rpms drop below a threshold limit. When the measured rpms rise above a threshold limit, sensor 60 may operate to switch the circulation pump 50 off to stop cycling water between the hot water tank 20 and heat exchanger 30.

It may be desirable to limit the maximum temperature of water discharged from heating system 10 in order to prevent scalding hot water. Coolant temperatures may reach temperatures as high as 180° F. During engine operation. If hot water temperatures equilibria with temperatures in the engine coolant line, the hot water may be scalding when it reaches a hot water tap. Therefore, the system 10 preferably includes a temperature control mechanism that limits the maximum temperature of water discharged into the hot water main 100. Referring to FIG. 1, a thermal mixing valve 70 is installed in hot water main 100 after the one-way valve 102. Thermal mixing valve 70 is operable to draw cold water into the hot water main 100 to lower the resultant temperature of water discharged from system 10. Cold water is mixed with hot water in the valve 70 to maintain the temperature below a predetermined maximum limit. Valve 70 draws cold water from a cold water feed line 72 connected to force main 5, as shown in FIG. 1. Thermal mixing valve 70 may include a thermostat control 74 that is adjustable to set the maximum hot water temperature in water exiting the valve. Valve 70 may be a standard thermal mixing valve product used in residential plumbing. In addition, mixing valve 70 may be connected or retrofit using any conventional plumbing connection. For example, threaded fittings may be soldered on to mixing valve 70, said fittings being configured to connect with screw-on hose barb fittings.

The hot water tank 20 may contain an electrical resistance heating unit 12 adapted for connection to an available external source of electric power. The supplemental electric heating unit 12 may be provided as part of the hot water tank or as a supplemental heating unit as part of the retrofit kit. When an external source of electric power is available, such as when the boat is docked, a current may be applied to the electrical resistance component 12 disposed in the hot water tank 20 to heat the water. During use of the electrical heating unit 12, fresh water may be added to the hot water tank 20. For example, water may be pumped from the fresh water supply 2 through the force main 5 to the hot water tank 20 until pressure on the inlet and discharge sides of check valve 18 is equalized. The check valve 18 prevents a reverse flow of water from the hot water tank 20 back to the water supply 2.

When an external power source is no longer available, the boat engine 3 may be engaged and used to heat the water in the hot water tank. In automatic systems, the sensor 60 can be used to regulate the circulation of water through heating system 10. If the sensor 60 monitors temperatures in the hot water tank 20, the circulation pump 50 will be activated in the active heating mode when the temperature in the tank falls below a threshold level. When the sensor 60 activates the circulation pump 50, water will be circulated between the hot water tank 20 and the heat exchanger 30. The heat generated in the engine 3 will be transferred to the engine coolant flowing in the coolant line 41. The heated engine coolant will then circulate through the second flow path 34 of the heat exchanger 30 where heat from the coolant will be transferred to water flowing through the first flow path 32. After passing through the exchanger 30, the coolant will then be circulated through the hot water tank 20 where additional heat can be transferred 40 to the water in the tank 20 in the vicinity of the conduit segment 44.

The sensor 60 will continue to monitor operating conditions as the heat transfer process progresses. When water temperature in the hot water tank reaches a maximum temperature, the sensor 60 may operate to switch the circulation pump 50 off. At this point, the system 10 can continue to operate in the passive heating mode. Under relatively high loads, the engine 3 will typically produce a sufficient amount of heat to heat the water in the hot water tank 20, without the need for additional heating in the heat exchanger 30. As water is heated in the hot water tank 20, hot water will rise to the top of the tank by convection. When the hot water is turned on in the boat, the heated water will exit the tank 20 through the hot water outlet port 24 and through the hot water main 100 to the ship's plumbing system. If an antiscalding mechanism such as a thermal mixing valve 70 is used, cold water will be drawn into hot water main 100 as necessary to maintain the temperature of discharged water below maximum limits. The high pressure pump 4 will operate as needed to pump a fresh supply of water from the water supply 2 into the hot water tank 20.

In general, the heating system 10 may be assembled and installed in its entirety in a new installation. Alternatively, the heating system 10 may be constructed by adding or retrofit ting components to existing water heating equipment. In certain applications, the circulation pump and heat exchanger can be added in series with an existing hot water tank and an existing coolant line from a boat engine with minimal disturbance to existing components.

The terms and expressions which have been employed have been used as terms of description and not of limitation. There is no intention in the use of such terms and expressions of excluding any equivalents of the features shown and described. It is recognized, therefore, that various modifications may be made within the scope and spirit of the invention, including but not limited to piping configurations and layout of equipment. Accordingly, the invention incorporates variations that fall within the scope of the following claims.

I claim:

1. A supplemental water heating kit for use with a hot water tank of a boat through cooperation with a coolant line for an engine of the boat, the hot water tank having a cold water inlet and a hot water outlet, the kit comprising:

(A) a heat exchanger adapted to be positioned externally of the hot water tank, the heat exchanger including an exchanger water inlet and an exchange water outlet with a first flow path extending from the exchanger water inlet to the exchanger water outlet for fluid connection between the cold water inlet and the hot water outlet of the hot water tank and a coolant inlet and a coolant outlet with a second flow path extending from the coolant inlet to the coolant outlet for fluid connection with the coolant line for the engine of the boat; and (B) a water pump for connection in fluid communication between the hot water tank and the exchanger water inlet of the heat exchanger, wherein the pump circulates water from the hot water tank through the first flow path of the heat exchanger as heated engine coolant from the engine is circulated through the second flow path of the heat exchanger to effect heat transfer from the heated engine coolant to the water circulating through the first flow path.

2. The kit of claim 1 wherein the water pump is connected between the hot water outlet of the hot water tank and the exchanger water inlet.

3. The kit of claim 1 comprising a water outlet line for the heat exchanger for fluid connection between the exchanger water outlet of the heat exchanger and the hot water tank to enable heated water from the heat exchanger to be circulated from the first flow path back into the hot water tank.

4. The kit of claim 3 wherein the water outlet line is connected between the exchanger water outlet and the cold water inlet of the hot water tank.

5. The kit of claim 4 comprising a one-way valve for connection with the cold water inlet of the hot water tank whereby the water outlet line from the heat exchanger is connected intermediate the hot water tank and the one-way valve so that the one-way valve prevents back flow of heated water from the heat exchanger and the hot water tank.

6. The kit of claim 1 comprising a water inlet line for the heat exchanger for connecting the hot water tank and the exchanger water inlet of the heat exchanger.

7. The kit of claim 6 wherein the water inlet line connects the pump between the hot water outlet of the hot water tank and the exchanger water inlet.

8. The kit of claim 6 comprising a one-way valve for connection with the hot water outlet of the hot water tank such that the water inlet line is connected intermediate the one-way valve and the hot water tank so that the one-way valve prevents back flow of water as the pump operates to circulate water from the hot water tank to the heat exchanger.

9. The kit of claim 1 comprising a coolant inlet line for fluid connection between the coolant line of the engine and the coolant inlet of the heat exchanger for supplying heated coolant from the coolant line to the second flow path of the heat exchanger.

10. The kit of claim 1 comprising a coolant outlet line for fluid connection between the coolant outlet of the heat exchanger and the coolant line of the engine to provide a flow of coolant from the second flow path of the heat exchanger into the coolant line of the engine.

11. The kit of claim 1 comprising a coolant inlet line for fluid connection between the coolant line of the engine and the coolant inlet of the heat exchanger and a coolant outlet line for fluid connection between the coolant outlet of the heat exchanger and the coolant line of the engine so that heated engine coolant is circulated from the coolant line of the engine through the second flow path.

12. The kit of claim 1 comprising a hot water main connected to the hot water outlet of the hot water tank, said hot water main being connected in fluid communication with a thermal mixing valve operable to draw a supply of cold water into the hot water main to maintain the temperature of water in the main below a maximum temperature.

13. A supplemental water heating kit for use with an existing hot water tank of a boat through communication with a coolant line from an engine of the boat, the hot water tank having a cold water inlet and a hot water outlet and an engine coolant conduit running through the hot water tank connected with the coolant line for the engine to heat water in the hot water tank, the kit comprising:

(A) a heat exchanger adapted to be positioned externally of the hot water tank, the heat exchanger including an exchanger water inlet and an exchanger water outlet with a first flow path extending from the exchanger water inlet to the exchanger water outlet for fluid connection between the cold-water inlet and the hot water outlet of the hot water tank and a coolant inlet and an coolant outlet with a second flow path extending from the coolant inlet to the coolant outlet for fluid connection with the coolant line for the engine of the boat;

(B) a water pump for connection in fluid communication between the hot water tank and the exchanger water inlet of the heat exchanger;

(C) a water outlet line for the heat exchanger for fluid connection between the exchanger water outlet of the heat exchanger and the hot water tank to enable heated water from the heat exchanger to be circulated from the first flow path of the heat exchanger back into the hot water tank;

(D) a water inlet line for the heat exchanger for connecting the hot water tank and the exchanger water inlet of the heat exchanger to supply water from the hot water tank to the heat exchanger;

(E) a coolant inlet line for fluid connection between the coolant line of the engine and the coolant inlet of the heat exchanger for supplying heated coolant from the coolant line of the engine to the second flow path of the heat exchanger; and (F) a coolant outlet line for fluid connection between the coolant outlet of the heat exchanger and the coolant line of the engine to provide a flow of coolant from the second flow path of the heat exchanger into the coolant line of the engine;

wherein the pump circulates water from the hot water tank through the first flow path of the heat exchanger as heated engine coolant is circulated through the second flow path of the heat exchanger to effect heat transfer from the heated engine coolant to the water circulating through the first flow path.

14. The kit of claim 13 wherein the water pump is connected on the water inlet line between the hot water outlet of the hot water tank and the exchanger water inlet.

15. The kit of claim 14 wherein the water outlet line is connected between the exchanger water outlet of the heat exchanger and the cold water inlet of, the hot water tank.

16. The kit of claim 15 comprising a one-way valve for connection with the cold water inlet of the hot water tank whereby the water outlet line from the heat exchanger is connected intermediate the hot water tank and the one-way valve so that the one-way valve prevents back flow of heated water from the heat exchanger and the hot water tank.

17. The kit of claim 16 comprising a second one-way valve for connection with the hot water outlet of the hot water tank such that the water inlet line is connected intermediate the second one-way valve and the hot water tank so that the second one-way valve prevents back flow of water as the pump operates to circulate water from the hot water tank to the heat exchanger.

18. The kit of claim 13 comprising a hot water main connected to the hot water outlet of the hot water tank, said hot water main being connected in fluid communication with a thermal mixing valve operable to draw a supply of cold water into the hot water main to maintain the temperature of water in the main below a maximum temperature.

19. A water heating system for use with a boat having a boat engine with a coolant line for the engine comprising:

(A) a hot water tank for containing a supply of heated water;

(B) a cold water source line connected with the hot water tank for supplying water to the hot water tank;

(C) a hot water supply line connected with the hot water tank for providing an outlet source of hot water from the hot water tank;

(D) a heat exchanger for transferring heat from heated engine coolant running through the coolant line of the engine to water from the hot water tank, the heat exchanger having a.first flow path in fluid connection with the hot water tank to provide a circulation of water to and from the hot water tank and a second flow path in fluid connection with the coolant line to provide a circulation of heated coolant to and from the heat exchanger; and (E) a pump in fluid communication with the hot water tank and the first flow path of the heat exchanger to pump water in circulation between the first flow path of the heat exchanger and the hot water tank.

20. The water heating system of claim 19 comprising a coolant inlet line for fluid connection between the coolant line of the engine and the heat exchanger and a coolant outlet line for fluid connection between the heat exchanger and the coolant line of the engine so that heated engine coolant is circulated from the coolant line of the engine through the second flow path.

21. The system of claim 20 wherein the heat exchanger includes a coolant inlet and a coolant outlet and the second flow path passes from the coolant inlet to the coolant outlet.

22. The system of claim 21 wherein the.coolant inlet line is connected between the coolant line of the engine and the coolant inlet of the heat exchanger and wherein the coolant outlet line is connected between the coolant outlet of the heat exchanger and the hot water tank.

23. The system of claim 19 comprising a water inlet line connected between the hot water tank and the heat exchanger and a water outlet line connected between the heat exchanger and the hot water tank to enable circulation of water between the hot water tank and the heat exchanger.

24. The system of claim 23 wherein the heat exchanger includes an exchanger water inlet and an exchanger water outlet with the first flow path extending from the exchanger water inlet to the exchanger water outlet.

25. The system of claim 24 wherein the hot water outlet of the hot water tank is connected with the exchanger water inlet of the heat exchanger by the water inlet line and the cold water inlet of the hot water tank is connected with the exchanger water outlet of the heat exchanger by the water outlet line.

26. The system of claim 24 wherein the hot water tank comprises a circulation outlet port and a circulation inlet port, said outlet port being in fluid connection with the exchanger water inlet and said inlet port being in fluid connection with the exchanger water outlet.

27. The system of claim 23 wherein the pump is connected bet ween the hot water tank and the heat exchanger in the water in let line.

28. The system of claim 27 comprising a one-way valve on the hot water supply line for the hot water tank and wherein the water inlet line is connected to the hot water supply line intermediate the one-way valve and the hot water tank so that the one-way valve prevents back flow of water along the hot water supply line as the pump operates to circulate water from the hot water tank to the heat exchanger.

29. The system of claim 28 comprising a second one-way valve on the cold water source line for the hot water tank, and wherein the water outlet line from the heat exchanger is connected to the cold water source line intermediate the hot water tank and the second one-way valve so that the second one-way valve prevents back flow of heated water from the heat exchanger and the hot water tank along the cold water source line.

30. The system of claim 19 comprising a thermal mixing valve being connected in fluid communication with the hot water supply line, said mixing valve operable to draw a supply of cold water into the hot water supply line to maintain the temperature of water in the hot water supply line below a maximum temperature.

31. A water heating system for use with a boat engine having a coolant line operable in an active heating mode and a passive heating mode, comprising:
    (A) a hot water tank containing a supply of water;
    (B) a heat exchanger external of the hot water tank;
    (C) a first flow path in the heat exchanger in fluid connection with the hot water tank to permit circulation of water between the heat exchanger and the hot water tank; and
    (D) a second flow path in the heat exchanger in fluid connection with the coolant line for the boat engine to permit circulation of engine coolant between the heat exchanger and the coolant line;
so that during operation in the active heating mode, water is circulated between the hot water tank and the heat exchanger as engine coolant is circulated between the coolant line and the heat exchanger to effect heat transfer from the engine coolant to the water, and during operation in the passive heating mode, circulation of water through the heat exchanger is stopped so that water remains in the hot water tank.

32. The system of claim 31 wherein the coolant line passes through the hot water tank so that the engine coolant cycles through the hot water tank to effect heat transfer to the water in the hot water tank.

33. The system of claim 31 comprising a pump in fluid communication with the hot water tank and the first flow path of the heat exchanger to pump water from the hot water tank through the heat exchanger.

34. The system of claim 33 comprising a sensor operable to control operation of the pump based on operating conditions in the boat.

35. The system of claim 34 comprising an actuator mechanism that is manually operable to override the sensor.

36. The system of claim 34 wherein the sensor controls pump operation based on the temperature of water in the hot water tank.

37. The system of claim 34 wherein the sensor controls pump operation based on rpms measured in the boat engine.

38. The system of claim 37 wherein the sensor is operable to activate the pump when the engine operates below an operator adjustable set point.

39. The system in claim 31 wherein the heat exchanger is one of a gasket ed plate heat exchanger, a brazed thin plate heat exchanger, and a shell and tube heat exchanger.

40. The system of claim 31 comprising a hot water main for discharging water from the hot water tank, said hot water main being connected in fluid communication with a thermal mixing valve operable to draw a supply of cold water into the hot water main to maintain the temperature of water in the main below a maximum temperature.

41. A method for heating fresh water on a boat, comprising the steps of:
    (A) running a boat engine to generate heat in the engine;
    (B) supplying water to a hot water tank;
    (C) providing a heat exchanger external to the hot water tank;
    (D) circulating water between the hot water tank and the heat exchanger; and
    (E) cycling a coolant from the engine through a coolant line that passes through the hot water tank to transfer heat to water in the hot water tank and through the heat exchanger to transfer heat to the water circulating through the heat exchanger.

42. The method of claim 41 wherein the step of circulating water between the hot water tank and heat exchanger comprises monitoring an operating condition in the boat and regulating transfer of water from the hot water tank to the heat exchanger based on the operating condition in the boat.

43. The method of claim 42 wherein the operating condition comprises water temperature in the hot water tank.

44. The method of claim 42 wherein the operating condition comprises rpms measured in the engine.

45. The method of claim 41 wherein the step of circulating water between the hot water tank and heat exchanger comprises periodic pumping of a flow of water from the hot water tank to the heat exchanger and back to the hot water tank.

46. The method of claim 45 wherein the step of cycling a coolant from the engine comprises passing the coolant through the heat exchanger counter current to the flow of water through the heat exchanger to efficiently transfer heat from the coolant to the water.

47. A water heating system for use with a boat having a boat engine with a coolant line for the engine comprising:
    (A) a hot water tank for containing a supply of water to be heated;
    (B) a cold water source inlet for the hot water tank for enabling water to be supplied to the hot water tank;
    (C) a hot water supply outlet for the hot water tank for providing an outlet source of hot water from the hot water tank;
    (D) a heat exchanger for transferring heat from heated engine coolant running through a coolant line of the engine to water to be heated in the hot water tank, the heat exchanger having a first flow path in fluid communication with water in the hot water tank to circulate the water through the heat exchanger and a second flow path in fluid communication with the coolant line to provide a circulation of heated coolant through the heat exchanger; and
    (E) a pump in fluid communication with the hot water tank and the first flow path of the heat exchanger to pump water in circulation between the first flow path of the heat exchanger and the hot water tank.

48. The water heating system of claim 47, wherein the heat exchanger is external to the hot water tank.

49. The water heating system of claim 47, wherein the pump is external to the hot water tank.

* * * * *